April 21, 1959   C. MITCHELL ET AL   2,882,787
MICRO-MEASUREMENT APPARATUS
Filed April 11, 1955
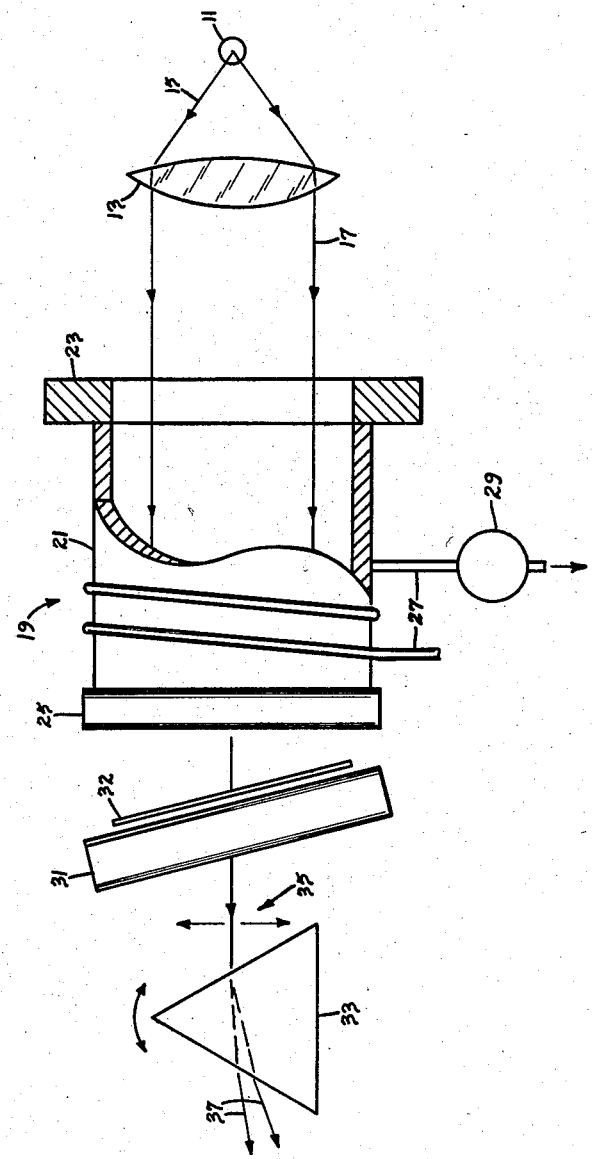
INVENTORS
CLAYBOURNE MITCHELL
RICHARD BLYTHE
ATTORNEYS

2,882,787

MICRO-MEASUREMENT APPARATUS

Claybourne Mitchell, Inkster, and Richard Blythe, Ypsilanti, Mich., assignors, by mesne assignments, to the United States of America as represented by the Secretary of the Navy Application April 11, 1955, Serial No. 500,708

2 Claims. (Cl. 88—14)

This invention relates to improvements in micro-measurement apparatus, and more particularly pertains to current-controlled interferometer measurement apparatus.

The use of moving styli or standard visual or photographic interferometry is well known, as reported by S. Tolansky in "Multiple Beam Interferometry," published 1947 by Clarendon Press. However, the contacting stylus method is a comparison measurement having no accurately known reference points, and interference techniques heretofore employed are static. In the subject device, collimated light passes through a magnetic field controlled interferometer filter and then through a spectrum-viewing device with fixed reference markings in its field of view, such as a calibrated spectrometer, so that, by measuring the currents required for the filter to pass known wavelengths, a yardstick is obtained for current against filter plate separation. Thus a direct reading of a milliammeter can be converted into a distance measurement to provide automatized, simple, dynamic and accurate measurement of exceedingly small distances.

The principal object of this invention is to provide improved micro-measurement apparatus.

Another object is to provide automatized, simple, dynamic and accurate means to measure small distances directly.

A further object is to provide interferometer measurement apparatus calibrated in terms of current values and adapted to measure directly and accurately small distances such as thicknesses of films, crystal defects, magnetostrictive or other micro motions, and the like.

Other objects and many of the attendant advantages of this invention will be readily appreciated as the same becomes better understood by reference to the following detailed description when considered in connection with the accompanying drawings wherein the single figure is a schematic diagram of micro measurement apparatus, showing a preferred embodiment of the invention.

Filtered or unfiltered light from a source 11 is passed through a collimating lens 13 that translates the divergent beam 15 to a parallel beam 17. The beam 17 is then passed through a magnetostrictive element 19 that comprises a tubular body portion 21, a base annulus 23 through which beam 17 is introduced to said element and a high reflectance interferometer plate 25 secured to the end of said element longitudinally opposite the end associated with base annulus 23. Driving coil 27 is wound around body portion 21 and is provided with a milliammeter 29 in series with said coil.

A second high reflectance interferometer plate 31 is positioned parallel to plate 25 or tilted relative plate 25, said plates being separated a minimum distance of the order of a few half wavelengths. (The pair of interferometer plates 25 and 31 is known as an interferometer filter.) The object 32 which is to be measured is interposed between plates 25 and 31. Although for clarity of illustration a separation is shown between the plate 31 and the object 32, in practice no such separation exists, the two being placed in actual contact with each other. A calibrated spectrometer 33 is positioned in the beam path to receive the spectral output (represented by line 35) emerging from plate 31.

The spectrometer 33 causes component colors in the light passed by the filter to appear at different angular positions, as indicated by the output spectral lines 37. By recording the current required to move the filter plate 25 sufficiently to cause successive fiducial spectral lines, whose wavelengths are known, to come into registry with a fixed reference point in the spectrometer or other suitable spectrum-viewing device, reference measurements are obtained for a current vs. filter plate separation calibration curve. Then a direct reading of milliammeter 29 can be converted into a distance measurement.

One method of calibration which may be employed is to set up the apparatus without any object 32 between the interferometer plates 25 and 31. A source of light, preferably monochromatic such as a sodium lamp, which emits several spectral lines of accurately known wavelength is utilized as a light source 11. The interferometer spacing and the spectrometer are then adjusted so that one of the spectral lines comes into registry with a reference line on the spectrometer calibrated scale and the coil current value is noted. The coil current is then varied in one direction until the succeeding spectral line of known wavelength comes into registry with the reference line and the current is again noted. This process is continued until enough data is obtained to allow the plotting of a filter-plate-spacing vs. current calibration curve. By repeating this process with various sources of light which have different spectral line outputs, definite current values may be obtained for very small filter-plate spacings and accurate interpolations may be made for current values required to cause filter-plate-spacing changes between these known values.

It may be noted that the function of the spectrometer is to provide fixed points to which the spectral lines may be referenced so that the precise amount of their movement may be ascertained. Although a conventional spectrometer is preferred, any spectrum-viewing device with fixed reference markings in its field of view may be employed.

To measure the thickness of an object 32, a source of either white or monochromatic light may be employed. The object is inserted so as to be visible over only half the field of view. The spacing of the filter plates is then set electrically to position a fiducial spectrum line at a reference point on the calibrated scale of the spectrometer. The current value is noted and the current is then varied, causing the filter spacing to change until the same line appears from the other half of the field of view. The current value is again noted. From the previously derived spacing vs. current calibration curve, the thickness of the object can be found. (It should be observed that to be strictly accurate a correction is required for the index of refraction of the material. Conversely, the device can also be employed in determining the index of refraction of thin transparent films.)

Another application of the invention is the measurement of minute displacements, e.g., a change in dimension of some object. After obtaining the current vs. spacing calibration curve for the invention, the object is affixed in any suitable way to plate 31 of the interferometer filter. The control current through the coil 27 is then varied in such a way as to maintain constant the intensity of one monochromatic spectrum line as detected at a fixed position in the spectrometer. This may be accomplished automatically by means of feedback techniques well known in the art. Thus, the device can be employed to measure displacements equivalent to a small fraction of a fringe shift.

Obviously many modifications and variations of the present invention are possible in the light of the above teachings. It is therefore to be understood that within the scope of the appended claims the invention may be practiced otherwise than as specifically described.

We claim:

1. Apparatus for measuring displacements and dimensions of the order of Angstrom units comprising, in combination: a light source; an interferometer having a plurality of interference plates spaced from each other and oriented to pass light from said source, said interference plates causing light passing therethrough to form an interference pattern containing interference lines; a magnetostrictive control element affixed to one said interference plate; means adapted to conduct a current and arranged to effect magnetostrictive movement of said magnetostrictive element and its affixed plate in response to said current, said movement effecting a change in said interference pattern; means to measure current passing through said magnetic means; and a spectrum-viewing device oriented to receive light passed by said interferometer and having markings visible in its field of view for use as fixed points against which spectral and interference lines may be referenced so that the extent of their movement may be ascertained.

2. Apparatus for measuring displacements and dimensions of the order of Angstrom units comprising, in combination: a collimated light source; an interferometer having a pair of interference plates spaced from each other and oriented to pass light from said source, said interference plates causing light passing therethrough to form an interference pattern containing interference lines; a magnetostrictive control element affixed to one said interference plate; a magnetic coil encircling and moving said magnetostrictive element and its affixed plate in response to current passed through said coil; means to measure current passing through said coil; and a spectrum-viewing device oriented to receive light passed by said interferometer and having markings visible in its field of view for use as fixed points against which spectral and interference lines may be positionally referenced so that the extent of their movement may be ascertained.

References Cited in the file of this patent

UNITED STATES PATENTS

| | | |
|---|---|---|
| 1,455,825 | Wood | May 22, 1923 |
| 2,312,888 | Everest | Mar. 2, 1943 |
| 2,338,981 | Straub | Jan. 11, 1944 |
| 2,518,647 | Teeple et al. | Aug. 15, 1950 |
| 2,534,846 | Ambrose et al. | Dec. 19, 1950 |